United States Patent [19]
Gow

[11] Patent Number: 5,828,732
[45] Date of Patent: Oct. 27, 1998

[54] GIFT ARTICLE VOICE GREETING SYSTEM

[75] Inventor: Brendan Patrick Gow, Darling Harbour, Australia

[73] Assignee: Voicecard Int'l Corporation Pty Ltd., New South Wales, Australia

[21] Appl. No.: 584,050

[22] Filed: Jan. 11, 1996

[30] Foreign Application Priority Data

Jan. 13, 1995 [AU] Australia .................................. PN0535

[51] Int. Cl.⁶ ...................................................... H04M 1/64
[52] U.S. Cl. ............................ 379/89; 379/112; 379/114; 379/144
[58] Field of Search ................................ 379/67, 88, 89, 379/144, 112, 113, 114, 116

[56] References Cited

U.S. PATENT DOCUMENTS

| | | | |
|---|---|---|---|
| 4,796,180 | 1/1989 | Riley | 364/400 |
| 4,847,890 | 7/1989 | Solomon | 379/6.7 |
| 5,251,251 | 10/1993 | Barbar | 379/67 |
| 5,355,406 | 10/1994 | Chencinski et al. | 379/88 |
| 5,438,615 | 8/1995 | Moen | 379/114 |

FOREIGN PATENT DOCUMENTS

| | | |
|---|---|---|
| 75307/91 | 12/1991 | Australia . |
| 75916/91 | 10/1992 | Australia . |
| 2225916 | 6/1990 | United Kingdom . |
| 92/17009 | 3/1992 | WIPO . |
| 95/03661 | 2/1995 | WIPO . |

Primary Examiner—Fan S. Tsang
Attorney, Agent, or Firm—Beveridge, DeGrandi, Weilacher & Young, LLP

[57] ABSTRACT

A gift article voice greeting system connected to a telecommunications network. The system having a message recording apparatus for recording voice messages from subscribers to the telecommunications network, a message replaying apparatus for replaying the voice messages to recipients, and an access control device to interface with the telecommunications network and connect a subscriber calling via the telecommunications network to the message recording apparatus. The access control device is adapted to generate an assigned unique password for each message recorded by the message recording apparatus and include a sound generator to transmit the assigned password to the subscriber. The access control device is further adapted to connect a recipient calling via the telecommunications network to the message replaying apparatus after the subscriber has given the previously assigned password to replay the message to the recipient. The system also includes a charge allocating system to direct a selected charge in respect of each call to the access control means to the subscriber or the recipient who calls the telecommunications network. The system further includes a printed information block associated with each gift article which includes information for placing a call to the access control device and a place for recording the assigned password.

9 Claims, 4 Drawing Sheets

---

Record a personal message with this card.

Sender: Please have a pen ready to write your unique PIN code in the boxes provided below. To send a message, dial 1900 737 7000 ($1.49/min) or 1800 123456 for Visa or Mastercard billing. Then just listen and follow the instructions.
(Messages cannot be recorded or listened to from outside Australia)

Receiver: If there is a 7 digit PIN code in the boxes above, a personal message has been recorded for you by the sender of this card. To hear your message dial either of the following numbers: FreeCall 1800 123 456 (max of 3 calls) or 1900 454 3600 (60¢/call) Then just listen and follow the instructions.

Messages are stored for 1 month • A touch tone telephone is recommended when using Voicecard and mandatory for credit card billing • No responsibility accepted for incorrectly written PIN codes nor the number of 1800 calls to that PIN • If under 18, ask parents' permission to call • VOICECARD™ is a registered trademark of Voicecard International Corporation, Sydney, Australia • For service difficulties or other enquires call 1800 632 004.

5,828,732

GIFT ARTICLE VOICE GREETING SYSTEM

BACKGROUND OF THE INVENTION

1. Field of the Invention

This inventions relates to voice messaging systems of the kind used in conjunction with a telecommunications system. More particularly, it relates to a gift article voice greeting system in accordance with which the recipient of a gift can listen to a recorded greeting message by means of a telecommunications network.

As used herein, the term "gift article" includes any physical article which may be given by one person to another. It includes greeting cards, boxes of chocolates, articles of clothing and any other item capable of being used as a gift and carrying an associated piece of printed information either by printing on the packaging, the article itself, or by means of an attached tag or label. The gift article may also be any printed medium, such as a card or letter itself, which is capable of displaying the printed information with the recorded message itself constituting the gift.

2. Description of the Related Art

Various voice message services are available including voice mail systems in which recorded messages can be left for selected individuals and subsequently replayed. Many of these systems include a facility by which the intended recipient can remotely access the recorded message via a telecommunications network using a pre-allocated password. Additionally, systems have been proposed in which a mail card is sold with a pre-allocated password in the form of a personal identification number (PIN) which allows the recipient to access a pre-recorded message via a telecommunications network. In systems of this type the revenue for the use of the service is generated by the sale of the card with the pre-allocated PIN.

There are several disadvantages inherent in this prior art system. First, the cost of production of a large number of otherwise identical cards, for example, is increased by the need to print a unique PIN on each item. Additionally, the PIN is preferably not visible until after purchase of the article to avoid unauthorized use of the system. A further difficulty is that each PIN allocated to an article at its date of manufacture must be stored in the system so that after sale the system can be accessed. This requires a rather large "stock" of unused PINs in the system since it may be many months before all articles are sold.

SUMMARY OF THE INVENTION

It is an object of this invention to provide a gift article voice greeting system which will overcome or substantially ameliorate one or more of the foregoing disadvantages.

Accordingly, in one aspect the present invention consists of a gift article voice greeting system connected to a subscriber telecommunications network said system comprising:

a message recording apparatus for recording voice messages from subscribers to said telecommunications network;

a message replaying apparatus for replaying said voice messages to subscribers to said telecommunications network;

access control means to interface with said telecommunications network and connect a subscriber calling via said telecommunications network to said message recording apparatus, said access control means being adapted to generate an assigned unique password for each message recorded by said message recording apparatus and including sound generating means to transmit said assigned password to said subscriber;

said access control means being further adapted to connect a subscriber calling via said telecommunications network to said message replaying apparatus after the provision by said subscriber of said previously assigned password to replay the message to which said password is assigned;

charge allocating means to direct a selected charge in respect of each call to said access control means to the subscriber to said telecommunications network;

and a printed information block associated with each said gift article, said block including data for placing a call to said access control means and a means for recordal of said assigned password.

Preferably, the access control means includes a provision to receive calls via two separate numbers within the telecommunications network. One of these telephone numbers is identified as a recording number and the second as a replaying number. The printed information block associated with each article contains details of these two numbers. In this way a simple method of the access control means directing calls to either the message recording apparatus or message replaying apparatus can be provided. In one alternative, an introductory message to the system can request a subscriber or user to select either the recording or replaying alternatives by the dialling of an appropriate digit.

The telecommunications network is preferably a publicly accessible telephone network provided by a commercial carrier. In the preferred embodiment the routing of the call from the subscriber to the access control means by the telecommunications network provides the charge allocating means which directs a predetermined charge to the subscriber's account.

It will be apparent that the gift article voice greeting system according to this invention avoids several of the identified difficulties with the prior art systems. In this regard, the generation of a PIN associated with each recorded message avoids the need for the storage of a large number of dormant PINs. Additionally, the systems according to this invention avoids the need for printing of an unique PIN on each gift article.

BRIEF DESCRIPTION OF THE DRAWING

One embodiment of this invention being its application to a greeting card will now be described, by way of example only, with reference to the accompanying drawings in which.

DESCRIPTION OF THE PREFERRED EMBODIMENTS

Figure 1:
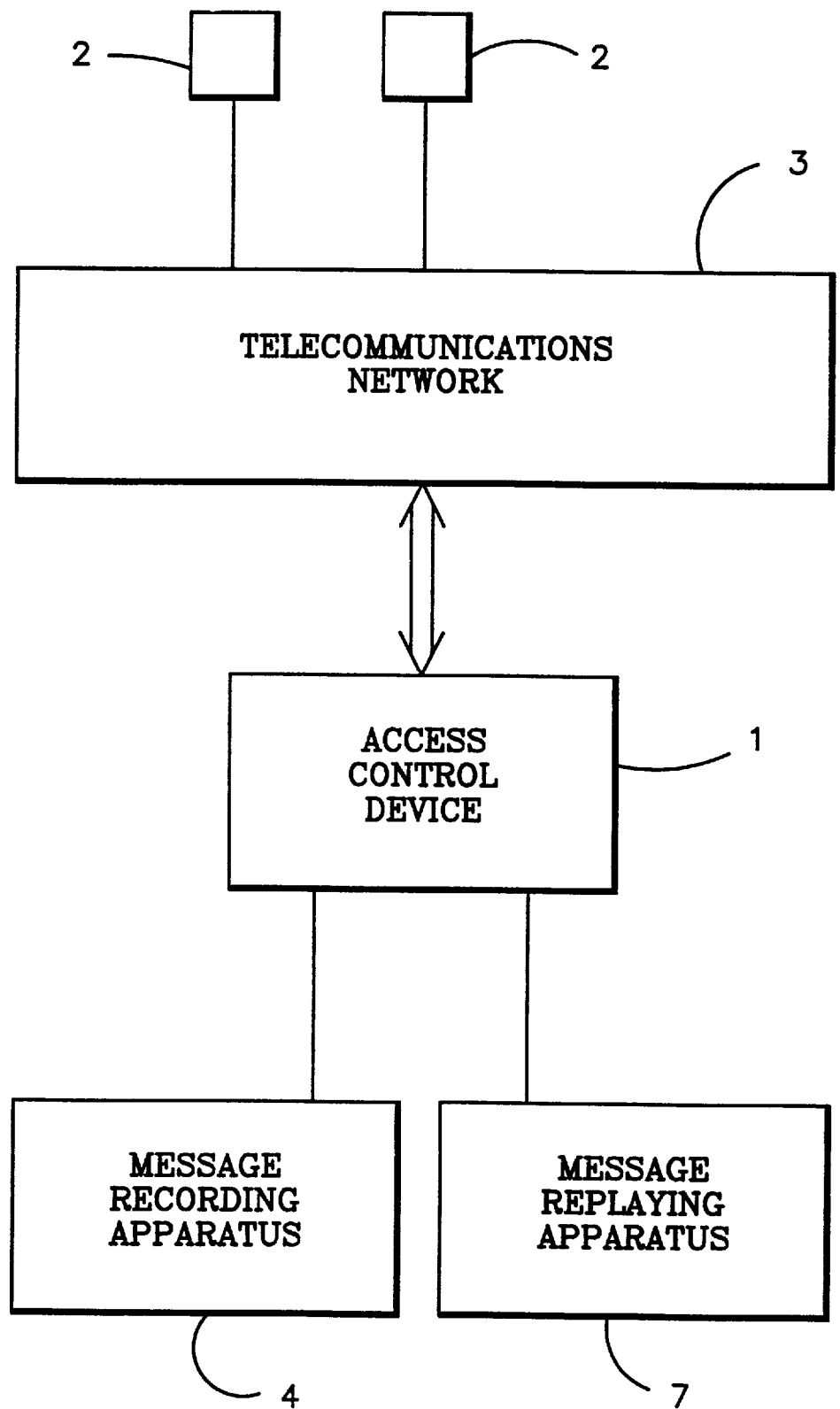
FIG. 1 is a schematic block diagram of a gift article voice greeting system according to the preferred embodiment.
Figure 2:
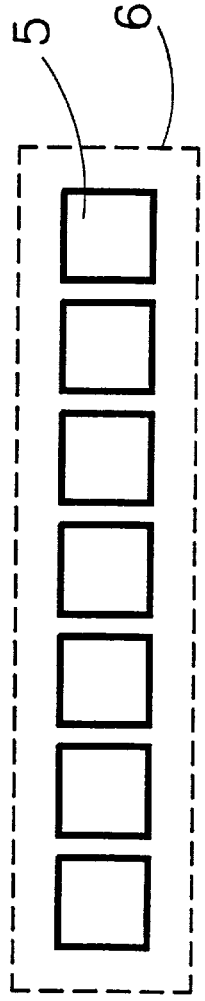
FIG. 2 is a schematic diagram of a printed information block forming part of the gift article voice greeting system of the preferred embodiment.

FIG. 1 is a block diagram of the hardware used in the voice greeting system. FIG. 2 shows an information block which is printed on a greeting card (not shown). The information block contains instructions for the placing of a call to an access control device 1 from a telephone 2. The call is routed via a public telecommunications network 3 such as that provided by TELSTBA Australia. Telecommunications carriers such as TELSTRA provide a service whereby they monitor the directing of any calls to a particular number and charge a pre-determined amount to the calling subscriber's account for that service. The amount charged to the subscriber less a service fee is then provided to the operator of the message service.

Figure 3:
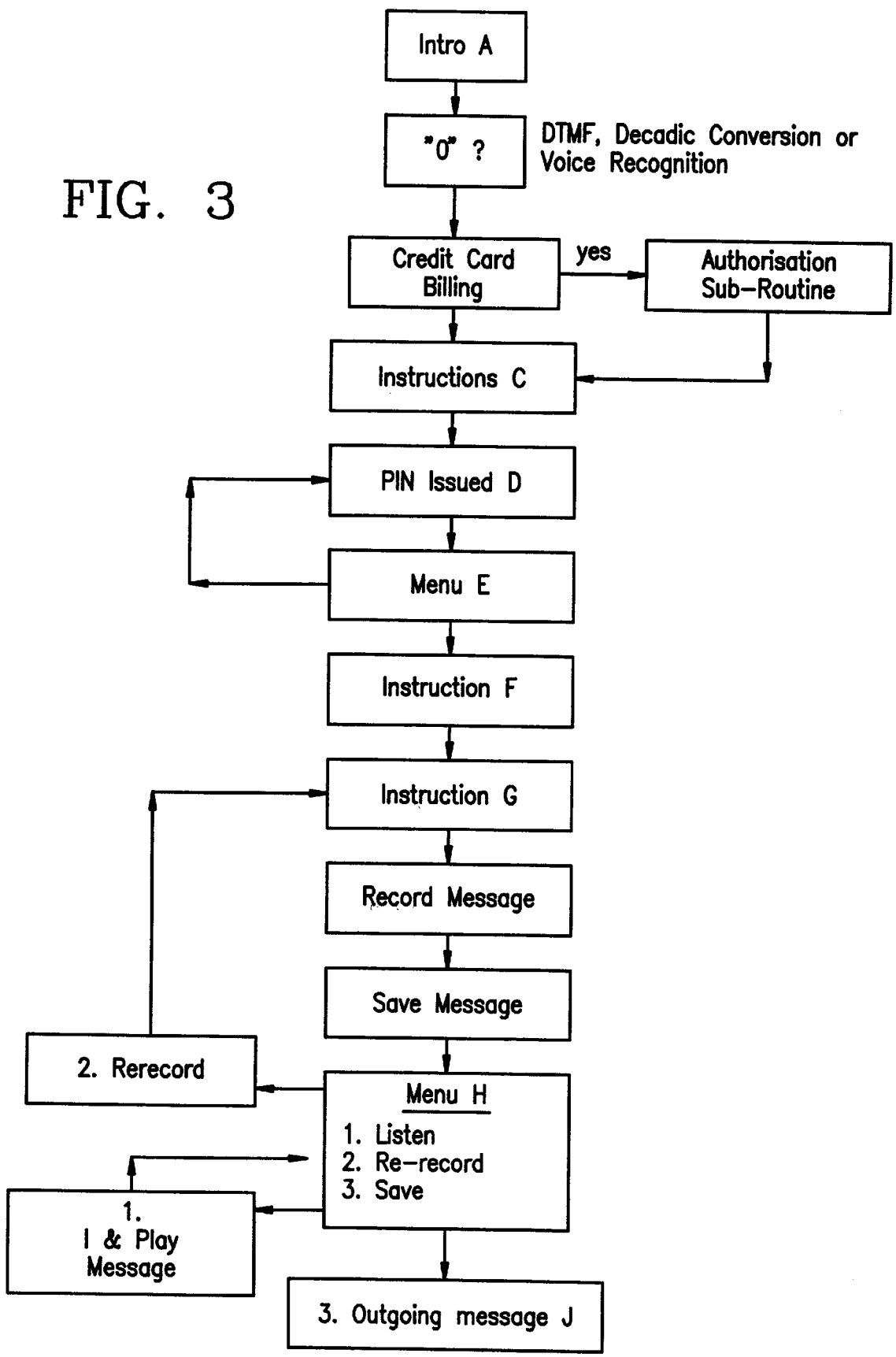
FIG. 3 is a flow chart of a recording sequence used in the system of the preferred embodiment.

Incoming calls are received by the access control device 1 on the recording telephone number. These calls are directed to a message recording device 4. FIG. 3 is a flow chart of the operation of the message recording apparatus and allocation of an assigned PIN to the recorded message by the access control device 1. The prompts used during the recording process shown in the flow chart are set out in Table 1 below:

TABLE 1

| | |
|---|---|
| A) | Welcome to Voicecard from The Ink Group. With Voicecard you can record a private message for anyone within Australia at only 95 cents per minute. To continue dial zero after the tone or hang up now. |
| B) | I'm sorry, our system has not detected your dialling. Please say zero after the tone. |
| C) | Recording a Voicecard message is easy. Do you have a pen handy? We will give you a unique message PIN code to ensure that only the receiver of your card hears your recorded message. Please write your PIN numbers, starting from the left, in the boxes provided on the back of your card. |
| D) | Your unique message PIN code is: [seven digit PIN code replayed] To confirm, your PIN code is: [seven digit PIN code replayed] |
| E) | If you would like to hear your pin code again dial 1. Otherwise dial 9 to record your message. |
| F) | In a moment you will be asked to record your message. You can play the message back or re-record it once you have finished. |
| G) | When you have finished recording, dial 9. Now, please begin recording your message after the tone. |
| H) | To listen to your Voicecard message dial 1. If you would like to re-record your message dial 2. If you are happy with your message, to save it dial 3. |
| I) | Here is the message you recorded: [recorded message replayed] |
| J) | Thank you for using Voicecard Interactive Greetings brought to you by The Ink Group, copyright 1995 Voicecard International Corporation, all rights reserved. |
| K) | I'm sorry, you seem to be having problems with your call. Please hang up and dial Freecall 1800 632004, that is 1800 632004. |

As will be apparent from the flow chart of FIG. 3 and the prompts in Table 1, a discrete PIN is assigned to each caller prior to the recording of their message. Provision is made to re-record the message or to listen to the completed message. As instructed by prompts C and D in Table 1, the caller recording the message writes the issued PIN in the boxes 5 provided in the information block of FIG. 2. In the case of plasticised greeting cards, the area within the dotted outline 6 is not plasticised so as to facilitate the writing of the PIN number on the card using a normal writing instrument, such as a ball point pen.

At the completion of the above procedure, the greeting card is mailed to the intended recipient. The recipient then performs the instructions in the printed information block shown in FIG. 2 to place a call to the access control device 1.

In another embodiment, the voice greeting system uses voice recognition software. In this embodiment the prompts E, J and K are respectively replaced by EV, JV and VK, as described below:

TABLE 2

| | |
|---|---|
| EV) | If you would like to hear your pin code again, after the tone say 1. Otherwise say 9 to record your message. |
| JV) | To stop recording be silent for 5 seconds. Now please begin recording your message after the tone. |
| KV) | To listen to your Voicecard message after the tone say 1. If you would like to record your message say 2. If you are happy with your message, to save it say 3. |

As described above a different telephone number is used to listen to the recorded greeting. Incoming calls on the replaying telephone number are directed to a message replaying apparatus 7 by access control device 1 and handled in accordance with the flow chart shown in FIG. 4. The prompts used during the message replaying process shown in the flow chart are set out in Table 3 below:

TABLE 3

| | |
|---|---|
| Q) | Congratulations, you've been sent a specially recorded Voicecard from The Ink Group. To hear your personal greeting dial zero after the tone. You will be charged a flat fee of 60 cents, otherwise hang up now. |
| R) | To hear your personal message, after the tone, simply dial in the 7 digit PIN number in the boxes on the back of this card, starting from the left. |
| S) | I'm sorry, this is not a valid PIN number. I only received 7 digits. After the tone please enter all 7 digits on the card. |
| T) | The PIN code detected is: [PIN code replayed] |
| U) | If this is correct dial 1 to hear your message, if it was wrong dial 2. |
| V) | I'm sorry, that PIN is not in our system. |
| W) | Please check the number and after the tone dial it again. |
| X) | Thank you for using Voicecard Interactive Greetings brought to you by The Inc Group, copyright 1995 Voicecard International Corporation, all rights reserved. |
| Y) | If you would like to listen to your special message again, please call the 1-900 listen number on the back of your card. The cost is 60 cents and you must be over 18 years of age or have parental permission. Good bye. |

In the voice recognition embodiment, the prompts R, S and W are respectively replaced with RV, SV and WV, as shown below:

TABLE 4

| | |
|---|---|
| RV) | On the back of your card there is a 7 digit PIN number. To hear your personal message, speak each digit clearly and precisely after each tone. If a mistake is made in understanding your number say STOP. You will be prompted to start again. Here is the first tone. |
| SV) | I'm sorry, this is not a valid PIN number. I only received 6 digits. Now, after each tone, please speak each of the 7 digits on the card. |
| WV) | Please check the PIN, and after each tone speak, clearly and precisely, each number again. |

Figure 4:
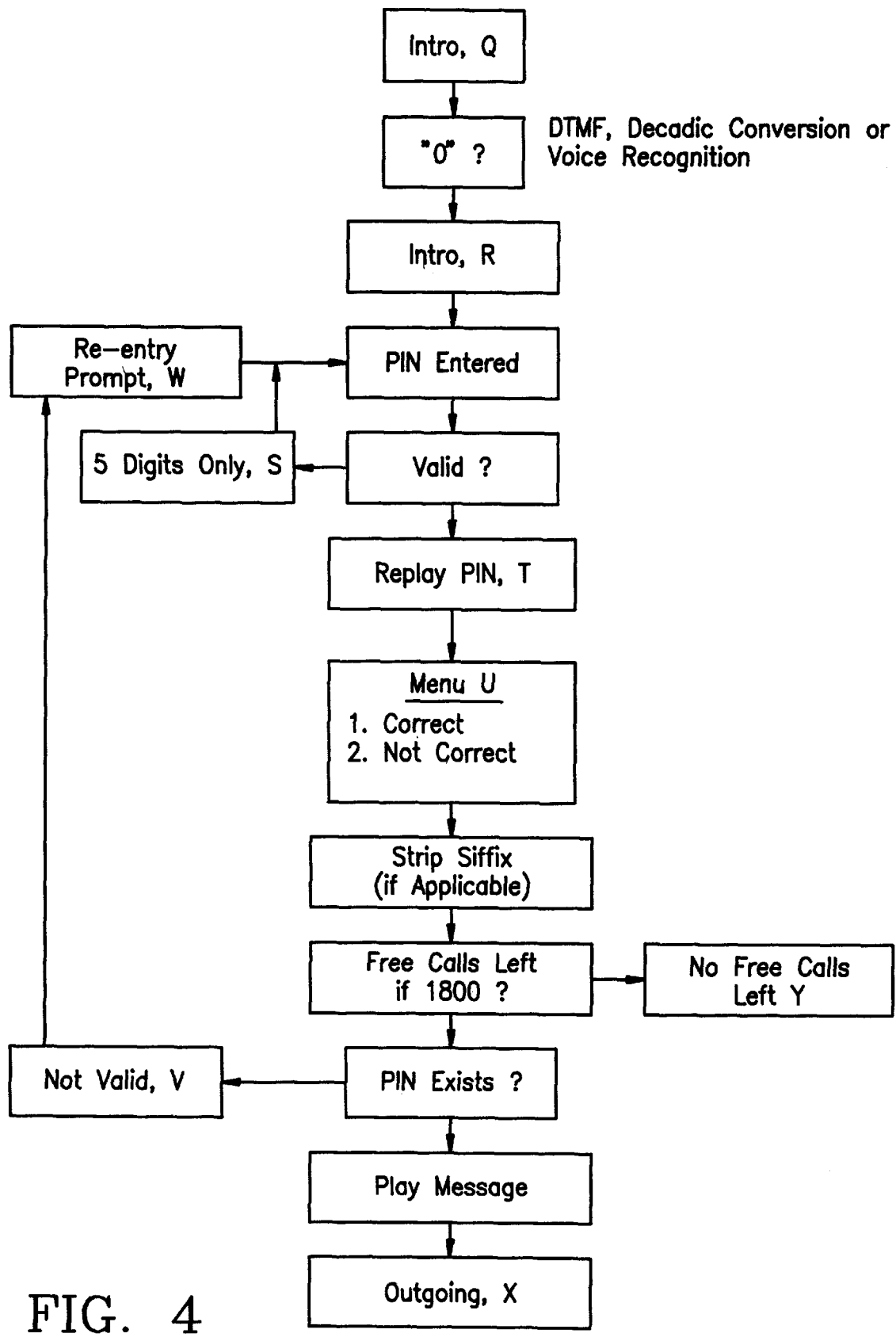
FIG. 4 is a listening sequence used in the system of the preferred embodiment.

As will be apparent from the flow chart of FIG. 4 and Tables 3 and 4 the caller is first informed of the cost of listening to the message. The caller is then required to enter the PIN written in the boxes 5 in the printed information block printed on the greeting card. If the correct PIN is provided the message is replayed to the recipient. In the system of the preferred embodiment the message is retained for a period of one month and during this period the recipient of the card can listen to the message as often as they wish during this 1-month period at a cost of 60c a listen using a 1-900 billing number, provided the correct PIN is entered each time.

In a first variation of this preferred system the recorder of the message may pay a higher recording fee of $1.49 per minute and provide the recipient with 3 free listening calls via a 1-800 free-call number, provided the correct PIN is entered during the one month period. In this first variation the recipient may also listen to the message after using their 3 free calls via a 1-900 billing number at a charge of 60c a listen.

In a second variation the recorder of the message may use a 1-800 credit card billing number, again at a cost of $1.49 per minute, which provides the recipient with 3 free calls, using a 1-800 number, and extra calls thereafter at 60c, each using a 1-900 billing number.

The foregoing describes only one embodiment of the invention and modifications can be made thereto without departing from the scope of the invention. For example, although the embodiment described above is directed to a greeting card, it will be apparent that the above described system can readily operate in connection with any other gift article. Such articles can include boxes of chocolates and items of clothing. The printed information block can be printed directly on a box of chocolates and in the case of articles such as clothing, printed on an attached gift tag.

I claim:

1. A gift article voice greeting system connected to a subscriber telecommunications network, said system comprising:

a message recording apparatus for recording a voice message from a subscriber;

a message replaying apparatus for replaying said voice message to a recipient;

access control means for interfacing with said telecommunications network and connecting the subscriber calling via said telecommunications network to said message recording apparatus, said access control means being adapted to generate an assigned unique password for each message recorded by said message recording apparatus and including sound generating means to transmit said assigned password to said subscriber wherein said access control means includes a portion to receive calls via two separate numbers within the telecommunications network and said access control means being further adapted to connect the recipient calling via said telecommunications network to said message replaying apparatus after the recipient calling the message replaying apparatus enters said previously assigned password to replay the message to which said password is assigned;

charge allocating means for directing a selected charge in respect of each call to said access control means to the subscriber or the recipient who has called via said telecommunications network; and a printed information block associated with each said gift article, said block including data for placing a call to said access control means and a means for recordal of said assigned password.

2. A system as claimed in claim 1 wherein one of the said two telephone numbers is identified as a recording number and the other as a replaying number.

3. A system as claimed in claim 2 wherein the printed information block associated with each article contains details of the two numbers.

4. A system as claimed in claim 1 wherein the telecommunications network is a publicly accessible telephone network provided by a commercial carrier.

5. A system as claimed in claim 4 wherein the routing of the call from the subscriber to the access control means by the telecommunications network provides the charge allocating means which directs a pre-determined charge to the subscriber's account.

6. A system as claimed in claim 1 wherein the gift article is a greeting card.

7. A system as claimed in claim 1 wherein the gift article is a box of chocolates, article of clothing or any other article capable of being used as a gift.

8. A system as claimed in claim 1 wherein the gift article is a printed card, flyer or letter.

9. A system as claimed in claim 4 wherein the routing of the call from the recipient to the access control means by the telecommunications network provides the charge allocating means which directs a pre-determined charge to the recipient's account.

* * * * *